US009621904B2

(12) United States Patent
Ernst et al.

(10) Patent No.: US 9,621,904 B2
(45) Date of Patent: *Apr. 11, 2017

(54) METHOD AND SYSTEM FOR TRANSMITTING MULTIPLE WIDE-AREA SURVEILLANCE AREA-OF-INTEREST VIDEO CODESTREAMS

(71) Applicant: PIXIA CORP., Reston, VA (US)

(72) Inventors: Rudolf O. Ernst, Leesburg, VA (US); Rahul C. Thakkar, Leesburg, VA (US)

(73) Assignee: PIXIA CORP., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,292

(22) Filed: Jun. 24, 2016

(65) Prior Publication Data

US 2016/0309170 A1   Oct. 20, 2016

Related U.S. Application Data

(63) Continuation of application No. 13/232,565, filed on Sep. 14, 2011, now Pat. No. 9,407,876.

(Continued)

(51) Int. Cl.
*H04N 19/167* (2014.01)
*H04N 7/18* (2006.01)
(Continued)

(52) U.S. Cl.
CPC ....... *H04N 19/167* (2014.11); *G06K 9/00771* (2013.01); *G06T 3/4038* (2013.01);
(Continued)

(58) Field of Classification Search
None
See application file for complete search history.

(56) References Cited

U.S. PATENT DOCUMENTS 4,823,108 A   4/1989  Pope
4,873,513 A   10/1989 Soults et al.
(Continued)

FOREIGN PATENT DOCUMENTS

JP   2000-148066 A   5/2000
WO     00/68887 A1   11/2000

OTHER PUBLICATIONS

Australian Office Action for Australian Patent Application No. 2007242940, mailed on Oct. 5, 2009.

(Continued)

*Primary Examiner* — Peter D Le
(74) *Attorney, Agent, or Firm* — Pillsbury Winthrop Shaw Pittman, LLP

(57) ABSTRACT

A method and system of transmitting a plurality of wide-area surveillance area-of-interest video codestreams is described, First and second video codestreams are generated from a plurality of large format images that are captured sequentially in time. The first video codestream has a first plurality of areas-of-interest selected from the plurality of large format images and the second video codestream has a second plurality of areas-of-interest from the same plurality of large format images. The first video codestream is generated at a first frame rate and the second video codestream is generated at a second frame rate and the first and second video codestreams are combined to obtain a combined video codestream at third frame rate. The combined video codestream is then transmitted through a link to a demultiplexer that regenerates the first and second video codestreams.

29 Claims, 9 Drawing Sheets

Related U.S. Application Data

(60) Provisional application No. 61/382,823, filed on Sep. 14, 2010.

(51) Int. Cl.
| | | |
|---|---|---|
| G06T 3/40 | (2006.01) | |
| H04N 7/24 | (2011.01) | |
| H04N 21/2365 | (2011.01) | |
| H04N 19/115 | (2014.01) | |
| H04N 19/172 | (2014.01) | |
| G06K 9/00 | (2006.01) | |
| H04L 29/06 | (2006.01) | |
| H04N 5/232 | (2006.01) | |

(52) U.S. Cl.
CPC ....... *H04L 65/602* (2013.01); *H04N 5/23238* (2013.01); *H04N 7/18* (2013.01); *H04N 7/24* (2013.01); *H04N 19/115* (2014.11); *H04N 19/172* (2014.11); *H04N 21/2365* (2013.01); *G09G 2340/02* (2013.01); *G09G 2340/04* (2013.01)

(56) References Cited

U.S. PATENT DOCUMENTS

| | | | |
|---|---|---|---|
| 4,878,117 | A | 10/1989 | Ikehira et al. |
| 5,263,136 | A | 11/1993 | DeAguiar et al. |
| 5,341,466 | A | 8/1994 | Perlin et al. |
| 5,414,809 | A | 5/1995 | Hogan et al. |
| 5,513,282 | A | 4/1996 | Williams |
| 5,611,041 | A | 3/1997 | Bril et al. |
| 5,706,451 | A | 1/1998 | Lightbody et al. |
| 5,710,835 | A | 1/1998 | Bradley |
| 5,819,278 | A | 10/1998 | Hamburg |
| 5,831,612 | A | 11/1998 | Stoval, III et al. |
| 5,847,705 | A | 12/1998 | Pope |
| RE36,145 | E | 3/1999 | DeAguiar et al. |
| 5,889,669 | A | 3/1999 | Kagami et al. |
| 5,905,506 | A | 5/1999 | Hamburg |
| 5,933,537 | A | 8/1999 | Hajjahmad et al. |
| 6,012,109 | A | 1/2000 | Schultz |
| 6,075,905 | A | 6/2000 | Herman et al. |
| 6,091,430 | A | 7/2000 | Bodin et al. |
| 6,118,820 | A | 9/2000 | Reitmeier et al. |
| 6,130,661 | A | 10/2000 | Ilbery |
| 6,141,023 | A | 10/2000 | Meinerth et al. |
| 6,182,127 | B1 | 1/2001 | Cronin, III et al. |
| 6,192,393 | B1 | 2/2001 | Tarantino et al. |
| 6,222,562 | B1 | 4/2001 | Leidich |
| 6,262,741 | B1 | 7/2001 | Davies |
| 6,278,432 | B1 | 8/2001 | Ratnakar |
| 6,323,854 | B1 | 11/2001 | Knox et al. |
| 6,377,306 | B1 | 4/2002 | Johnson et al. |
| 6,400,763 | B1 | 6/2002 | Wee |
| 6,493,858 | B2 | 12/2002 | Solomon |
| 6,507,615 | B1 | 1/2003 | Tsujii et al. |
| 6,549,681 | B1 | 4/2003 | Takiguchi et al. |
| 6,674,881 | B2 | 1/2004 | Bacus et al. |
| 6,711,283 | B1 | 3/2004 | Soenksen |
| 6,714,205 | B1 | 3/2004 | Miyashita et al. |
| 6,721,952 | B1 | 4/2004 | Guedalia et al. |
| 6,904,176 | B1 | 6/2005 | Chui et al. |
| 6,912,253 | B1 | 6/2005 | Li et al. |
| 6,912,695 | B2 | 6/2005 | Ernst et al. |
| 7,080,131 | B2 | 7/2006 | Palevich et al. |
| 7,085,435 | B2 | 8/2006 | Takiguchi et al. |
| 7,119,811 | B2 | 10/2006 | Ernst et al. |
| 7,366,360 | B2 | 4/2008 | Takiguchi et al. |
| 7,607,106 | B2 | 10/2009 | Ernst et al. |
| 7,856,055 | B2 | 12/2010 | Zhou et al. |
| 2002/0004860 | A1 | 1/2002 | Roman |
| 2002/0093516 | A1 | 7/2002 | Brunner et al. |
| 2002/0102026 | A1 | 8/2002 | Rijavec et al. |
| 2002/0159632 | A1 | 10/2002 | Chui et al. |
| 2002/0194302 | A1 | 12/2002 | Blumberg |
| 2002/0196467 | A1 | 12/2002 | Delhoune et al. |
| 2003/0031258 | A1 | 2/2003 | Wang et al. |
| 2003/0034936 | A1 | 2/2003 | Ernst et al. |
| 2003/0063127 | A1 | 4/2003 | Ernst et al. |
| 2003/0067420 | A1 | 4/2003 | Ernst et al. |
| 2004/0218902 | A1 | 11/2004 | Yanagita |
| 2006/0210196 | A1 | 9/2006 | Wensley et al. |
| 2006/0215752 | A1 | 9/2006 | Lee et al. |
| 2006/0245379 | A1 | 11/2006 | Abuan et al. |
| 2007/0124793 | A1 | 5/2007 | Wang et al. |
| 2008/0225116 | A1 | 9/2008 | Kang et al. |
| 2009/0116688 | A1 | 5/2009 | Monacos et al. |
| 2009/0285217 | A1 | 11/2009 | Frink et al. |
| 2010/0106838 | A1 | 4/2010 | Segev et al. |
| 2010/0232504 | A1 | 9/2010 | Feng |
| 2012/0233228 | A1 | 9/2012 | Barton et al. |
| 2012/0233293 | A1 | 9/2012 | Barton et al. |
| 2012/0233522 | A1 | 9/2012 | Barton et al. |

OTHER PUBLICATIONS

Canadian Office Action issued regarding Canadian Patent Application No. 2,406,675, mailed Jul. 30, 2010.
Canadian Office Action issued regarding Canadian Patent Application No. 2,463,671, mailed Jul. 8, 2010.
Chinese Office Action for Chinese Patent Application No. 038244276, mailed on Oct. 26, 2007.
Chinese Office Action for Chinese Patent Application No. 038244276, mailed on Aug. 8, 2008.
Chinese Office Action for Chinese Patent Application No. 038244276, mailed on Feb. 6, 2009.
European Office Action for European Patent Application No. 02759681.6, mailed on Sep. 22, 2008.
Supplemental European Search Report for European Patent Application No. 02759681.6, mailed on Jun. 27, 2008.
European Office Action for European Patent Application No. 03799307.8, mailed on Jan. 23, 2009.
Supplemental European Search Report for European Patent Application No. 03799307.8, mailed on Jun. 27, 2008.
Israeli Office Action for Israeli Patent Application No. 167711, mailed on Jan. 25, 2009.
Israeli Office Action for Israeli Patent Application No. 167711, mailed on Oct. 11, 2009.
Israeli Office Action for Israeli Patent Application No. 167711, mailed on Jun. 24, 2010.
Japanese Office Action for Japanese Patent Application No. 2004-541816, mailed on Feb. 2, 2010.
International Preliminary Examination Report for PCT International Patent Application No. PCT/US02/29210, mailed on May 24, 2004.
International Search Report for PCT International Patent Application No. PCT/US02/29210, mailed on Dec. 17, 2002.
International Preliminary Examination Report for PCT International Patent Application No. PCT/US03/30639, mailed on Dec. 3, 2004.
International Search Report for PCT International Patent Application No. PCT/US03/30639, mailed on Apr. 21, 2004.
Philippines Office Action for Philippines Patent Application No. 1-2005-500632, mailed on Feb. 19, 2009.
Barclay et al., Microsoft TerraServer: A Spatial Data Warehouse, The Institution of Electrical Engineers Stevenage, Jun. 2000, Great Britain; and 2000 ACM Sigmod. International Conference on Management of Data, May 16-18, 2000, Dallas, Texas, vol. 29, No. 2, Jun. 1, 2000, pp. 307-318, retrieved from url: <ftp://ftp.research.microsoft.com/pub/tr/tr-99-29.pdf>.
Bhatia et al., Design and Performance Analysis of a Distributed Image Space Navigator, Internet citation Aug. 1, 1997, Washington University Sever Institute of Technology, Department of Computer Science.
Yu et al., Processing Satellite Images on Tertiary Storage: A Study of the Impact of the Tile Size on Performance, NASA Conference on Mass Storage Systems, Sep. 1, 1996, College Park, Maryland, retrieved from url: <http://ntrs.nasa.gov/archive/nasa/casi.ntrs.nasa.gov/19960052752_1996083214.pdf>.

(56) References Cited

OTHER PUBLICATIONS

Information Technology—Generic Coding of Moving Pictures and Associated Audio Information: Systems, International Standard, ISO/IEC 13818-1, Second Edition, Dec. 1, 2000.
Japanese Decision of Rejection for Japanese Patent Application No. 2004-541816, mailed on Nov. 24, 2010.
Japanese Official Letter of Inquiry and Pre-Appeal Examination Report for Japanese Patent Application No. 2004-541816, mailed on Sep. 13, 2011.
Canadian Office Action for Canadian Patent Application No. 2,463,671, mailed Aug. 15, 2011.

METHOD AND SYSTEM FOR TRANSMITTING MULTIPLE WIDE-AREA SURVEILLANCE AREA-OF-INTEREST VIDEO CODESTREAMS

CROSS REFERENCE TO RELATED APPLICATION

This application is a continuation of U.S. application Ser. No. 13/232,565, filed on Sep. 14, 2011, which claims the benefit of U.S. Application No. 61/382,823, filed on Sep. 14, 2010, the entire contents of both applications are incorporated herein by reference in their entirety.

BACKGROUND OF THE INVENTION

Field of the Invention

The present invention pertains to image data management and in particular to a method and system for encoding and decoding multiple wide-area surveillance area-of-interest video codestreams.

Discussion of Related Art

A very large image generally contains a plurality of pixels, for example, several hundreds of megapixels (Mp) or several thousands of megapixels. Each pixel has one, two or more bands. Each band has a certain color depth or bit depth. For example, an RGB color-based image has 3 bands, the red band (R), the green band (G) and the blue band (B). Each of the R, G and B bands can have a depth of 8 bits or more. Hence, in this example, each pixel can have a total bit depth of 24 bits or more. In another example, an infra-red (IR) image has 1-band, the IR-band. This band can have a bit depth of 12-bits. For the purpose of computational convenience, it can be stored within 16-bits. Hence, in this example, each pixel can have a total bit depth of 16-bits.

An image sensor can be used to capture a series of images, each image having several hundred megapixels. The images may be captured in sequence, for example at a reasonably constant frequency (e.g., 2 Hz). Each image (i.e., each still image) in the sequence or series of images may have one or more distinct bands and may cover any part of the electromagnetic spectrum that can be captured by the image sensor. The image sensor may be a single sensor or a combination or a matrix of multiple sensors arranged to generate a single image.

The captured series of images are referred to interchangeably as wide-area surveillance imagery, wide-area motion imagery (WAMI) or wide-area persistent surveillance imagery.

BRIEF SUMMARY OF THE INVENTION

An aspect of the present invention is to provide a method of encoding and decoding a plurality of WAMI area-of-interest (AOI) video codestreams. The method includes generating, by a computer server, a plurality of video codestreams, each video codestream comprising a plurality of AOIs of a plurality of WAMI images. The method further includes multiplexing, by a multiplexer in communication with the computer server, the plurality of video codestreams into a multiplexed video codestream, transmitting the multiplexed video codestream from a first location to a second remote location; and demultiplexing the multiplexed video codestream at the second location to regenerate the plurality of video codestreams.

Although the various steps of the method are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF EMBODIMENTS OF THE INVENTION

Figure 1:
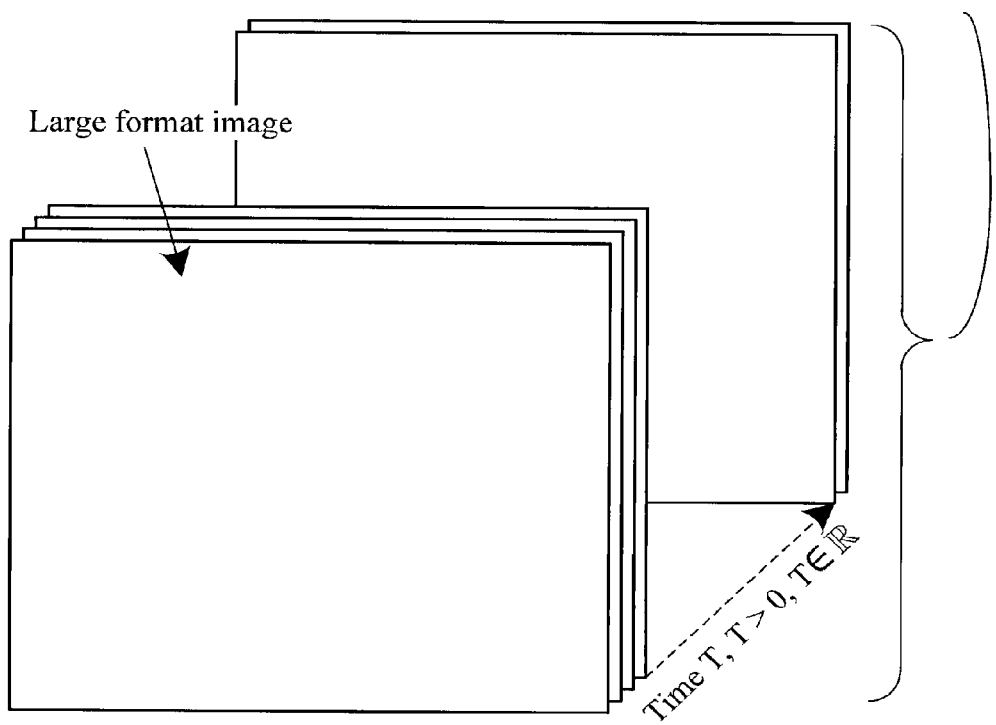
FIG. 1 depicts schematically wide-area surveillance imagery, according to an embodiment of the present invention.

FIG. 1 depicts schematically wide-area surveillance imagery, according to an embodiment of the present invention. The wide-area surveillance imagery comprises a plurality of very large images. Each very large image is W-pixels wide by H-pixels tall. In addition each very large image has N-bands (where N is an integer greater than 0) and each band has a bit-depth B (where B is an integer greater than 0). An example of very large images can be images having 10,000 pixel wide (W-pixels) by 9,600 pixel tall (H-pixels), a total size of 96 Mp. Another example of very large images can be images having 12,000 pixel wide (W-pixels) by 12,000 pixel tall (H-pixels), a total size of 144 Mp. Another example of very large images can even be images 40,000 pixel wide (W-pixels) and 40,000 pixel tall (H-pixels), a total size of 1600 Mp.

The plurality of very large images are collected by one or more sensors multiple times per second (H Hz) over a period of time T. H and T are greater than zero and are real numbers (H, T>0 and H, T∈ℝ). A group of very large images is considered a collection of images. Such very large images cannot be practically transmitted or visualized in their entirety using existing techniques on a display device. Present commercial display devices have a pixel width ($D_W$) and a pixel height ($D_H$) that are substantially smaller than the pixel width (W) of the image and the pixel height (H) of the image, respectively ($D_W \ll W$ and $D_H \ll H$). In addition, current commercial display devices can display $D_N$ bands at a bit-depth of $D_B$. The number of bands ($D_N$) in the display device can be the same or different from the number of bands (N) within the image. Similarly, the bit-depth ($D_B$) of each band in the display device can also be the same or different from the bit-depth (B) of a band within the image.

In order to display a large format or size image on a smaller size display device, the size of the large format image should be reduced, for example, by zooming out of the large format image. However, this involves reducing the number of pixels within the large format image and thus degrading the resolution of the image.

In order to display a large format image at complete pixel size (e.g., substantially 100% pixel size), an area of interest (AOI) or a viewport must be extracted from the large format image to be displayed on the display device.

Figure 2:
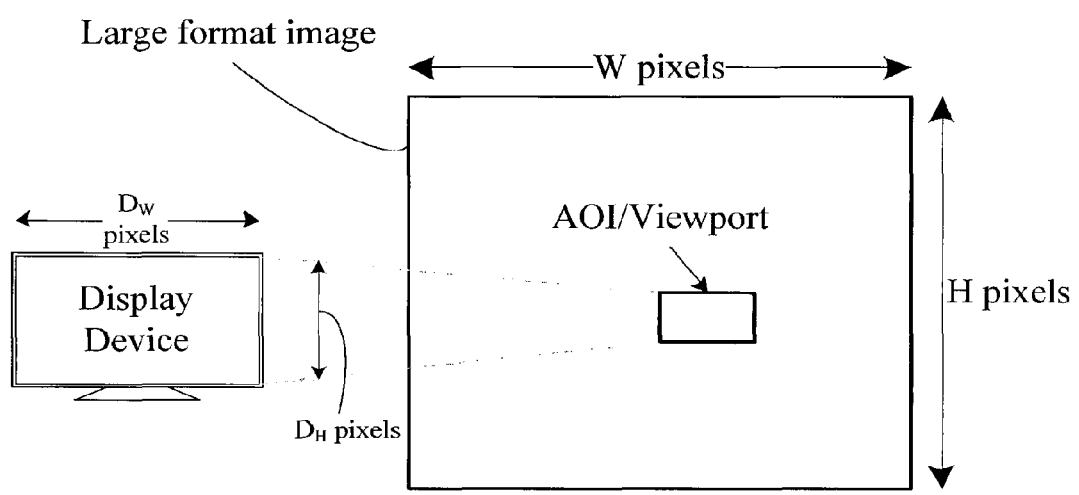
FIG. 2 shows schematically an example of an AOI within a very large image (W-pixels by H-pixels), according to an embodiment of the present invention.

FIG. 2 shows schematically an example of an AOI within a very large image (W-pixels by H-pixels), according to an embodiment of the present invention. The size of the AOI is substantially the same as the size of the display device ($D_W$-pixels by $D_H$-pixels). If the number of bands (N) within the large format image is different from the number of bands ($D_N$) of the display device, a conventional method can be applied to generate ($D_N$) bands from one or more of the (N) bands in the large format image to display a portion (AOI) of the large format image on the display device. Similarly, if the bit-depth (B) within the large format image is different from the bit-depth ($D_B$) of the display device, a conventional method can be applied to convert the bit-depth (B) into the bit-depth ($D_B$) of the display device so as to display the portion (AOI) of the large format image on the display device.

Figure 3A:
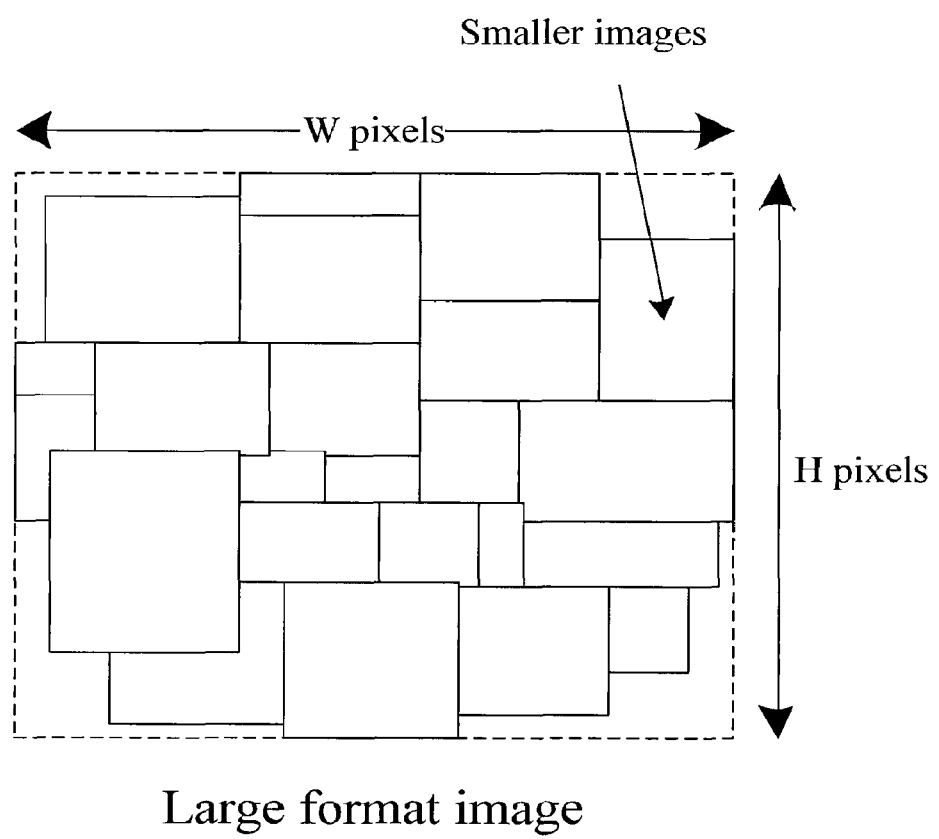
FIGS. 3A and 3B show a schematic representation of a large format image, according to another embodiment of the present invention.
Figure 3B:
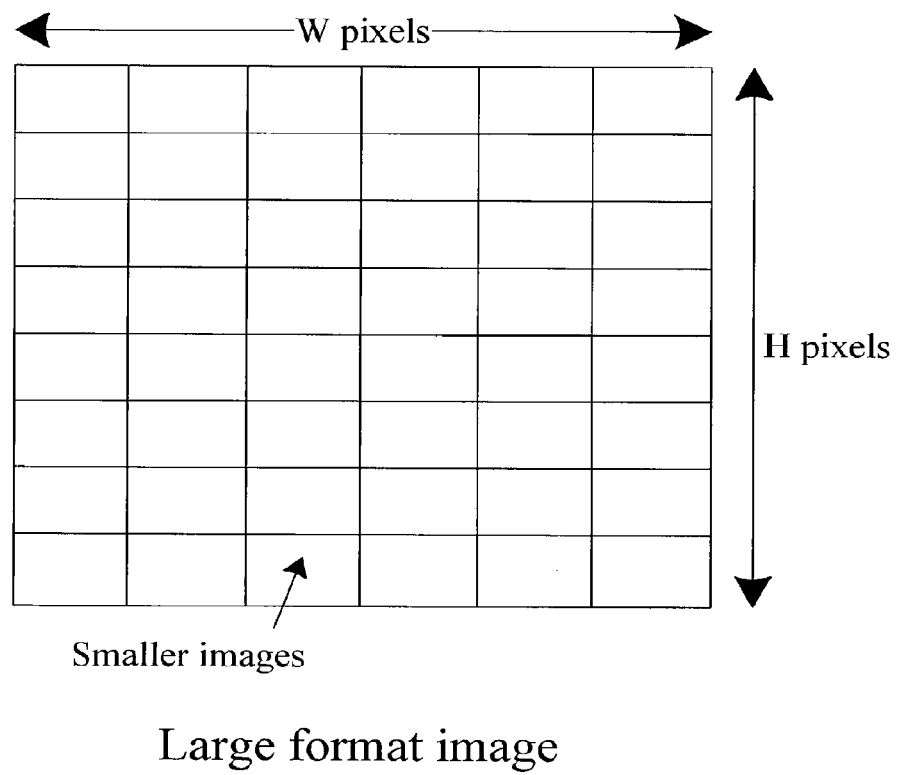

FIGS. 3A and 3B show a schematic representation of a large format image, according to another embodiment of the present invention. In this embodiment, the large format image comprises a set of smaller images having a pixel width ($S_W$) and a pixel height ($S_H$). Each smaller image is substantially smaller in pixel width and pixel height than the large format image ($S_W>0$, $S_H>0$, $W \gg S_W$, $H \gg S_H$). The pixel width ($S_W$) and the pixel height ($S_H$) of each smaller image can be the same, less or greater than, respectively, the pixel width of the display ($D_W$) and the pixel height of the display ($D_H$). Each smaller image has the same number of bands and the same bit-depth as the large format image. Each smaller image is acquired at substantially the same time as the other smaller images in the same set of smaller images of a large format image. Each smaller image can be combined with the other smaller images in the same set of smaller images to create or generate a mosaic of images within the large format image, as shown in FIG. 3A or as shown in FIG. 3B.

Figure 4:
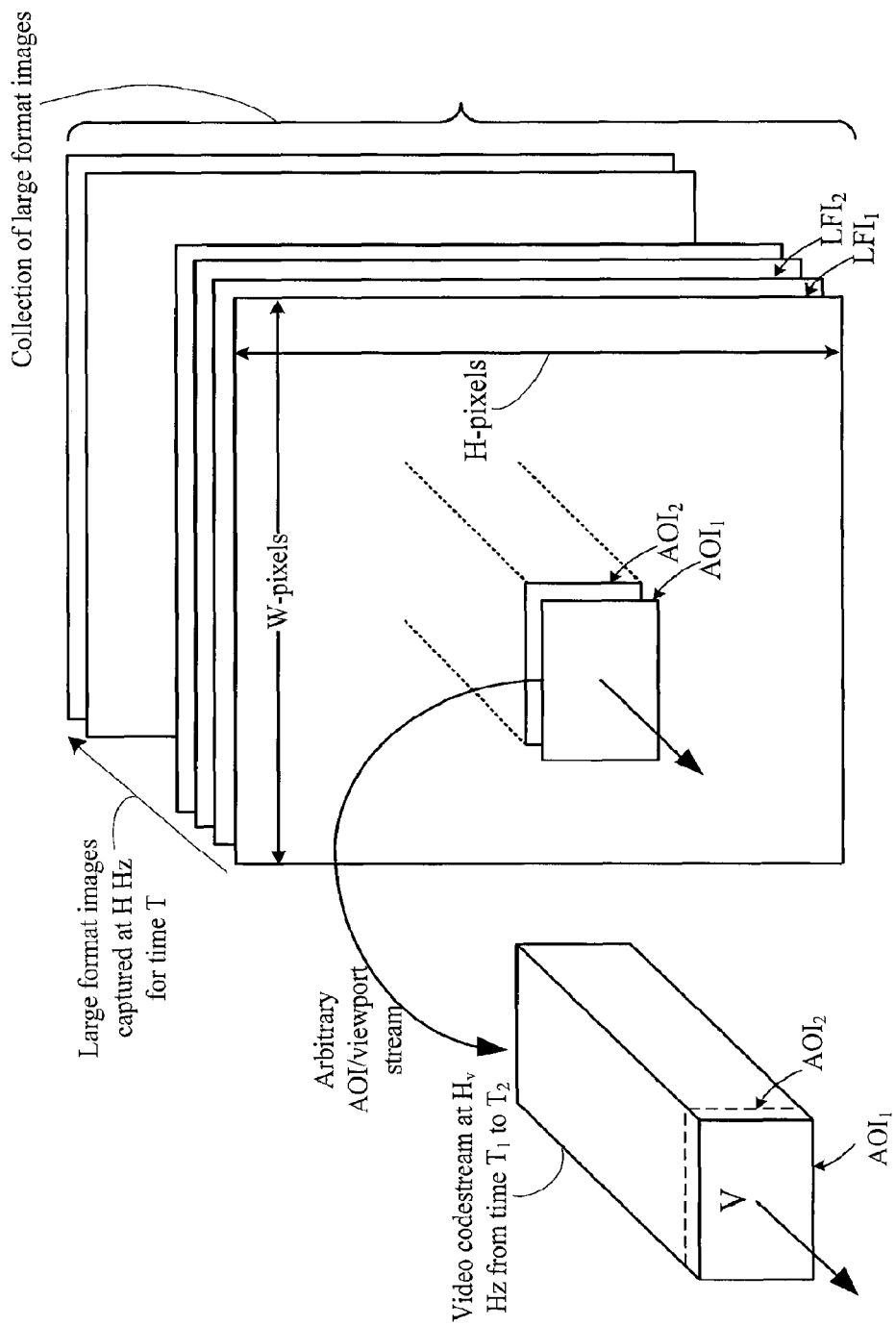
FIG. 4 shows an example of a single video codestream generated from a sequence of areas-of-interest (AOIs) from one collection of very large images, according to an embodiment of the present invention.

FIG. 4 shows an example of a single video codestream generated from a sequence of AOIs from one collection of very large images, according to an embodiment of the present invention. In order to display or playback a sequence of AOIs from multiple very large images in a collection (e.g., collection of large format images shown in FIG. 1), the sequence of AOIs can be encoded into a single video codestream. Each AOI is selected from a corresponding very large image. For example, $AOI_1$ can be selected from large format image $LFI_1$, $AOI_2$ can be selected from large format image $LFI_2$, etc. By arranging $AOI_1$, $AOI_2$, etc., in sequence, a video codestream V can be generated. Although $AOI_1$, $AOI_2$, etc. are described being generated as video codestream V in the order the large format images $LFI_1$, $LFI_2$ are acquired, $AOI_1$, $AOI_2$, etc. can also be arranged arbitrarily in any desired order, for example $AOI_2$ then $AOI_1$, etc., to be displayed as video codestream V. For example, the video codestream V can be generated from AOIs (e.g., $AOI_1$, $AOI_2$, etc.) extracted from images ($LFI_1$, $LFI_2$, etc.) starting at time $T_1$ and ending at time $T_2$, where time $T_1$ may or may not correspond to the time of generating or acquiring $LFI_1$. Moreover, the video codestream V may or may not contain AOIs from one or more of the large format images (LFIs). For example, the video codestream V can be generated from AOIs extracted from every other captured large format image in the collection of large format images. Therefore, the video codestream V is generated at a rate $H_v$ Hz that can be equal or different from the rate H Hz of capturing or acquiring the collection of large format images (LFIs).

Figure 5:
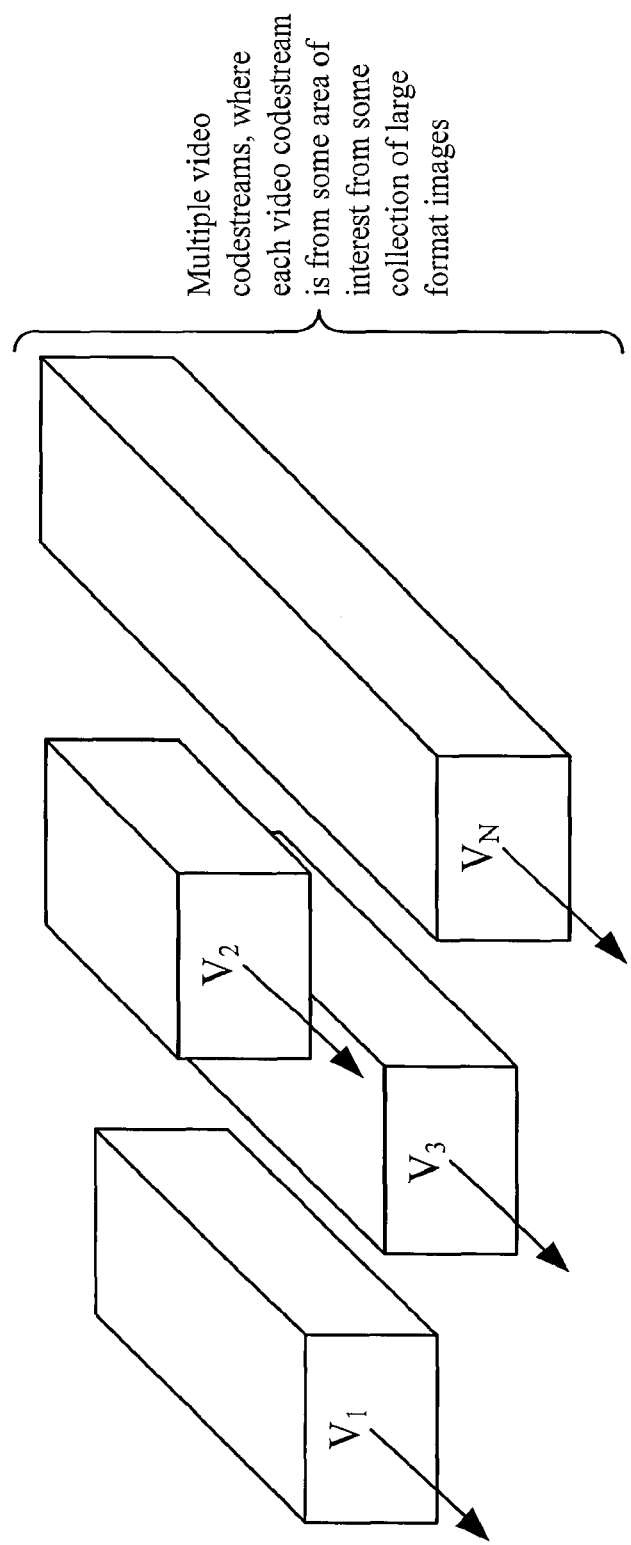
FIG. 5 depicts schematically a plurality of codestreams, according to an embodiment of the present invention.

FIG. 5 depicts schematically a plurality of codestreams $V_1$, $V_2$, $V_3$, ..., $V_N$, according to an embodiment of the present invention. The codestreams $V_1$, $V_2$, $V_3$, ..., $V_N$ may have equal number of AOIs or different number of AOIs. In one embodiment, each video codestream $V_1$, $V_2$, $V_3$, ... $V_N$ can be generated from a plurality or sequences of AOIs within the plurality of very large images. For example, video codestream $V_1$ can be generated from plurality or sequence of AOIs at location 1 within the plurality of large format images, codestream $V_2$ can be generated from plurality or sequence of AOIs at location 2 within the large format images, etc. In addition, each video codestream $V_1$, $V_2$, $V_3$, ... $V_N$ can be generated starting at the same time (i.e., at the same large format image) or at different times (i.e., at different large format images). For example, video codestream $V_2$ can be generated starting by $AOI_1$ in $LFI_1$ while video codestream $V_2$ can be generated starting by $AOI_2$ in $LFI_2$. Similarly, each video codestream $V_1$, $V_2$, $V_3$, ... $V_N$ can be ended at the same time or at different time.

Figure 6:
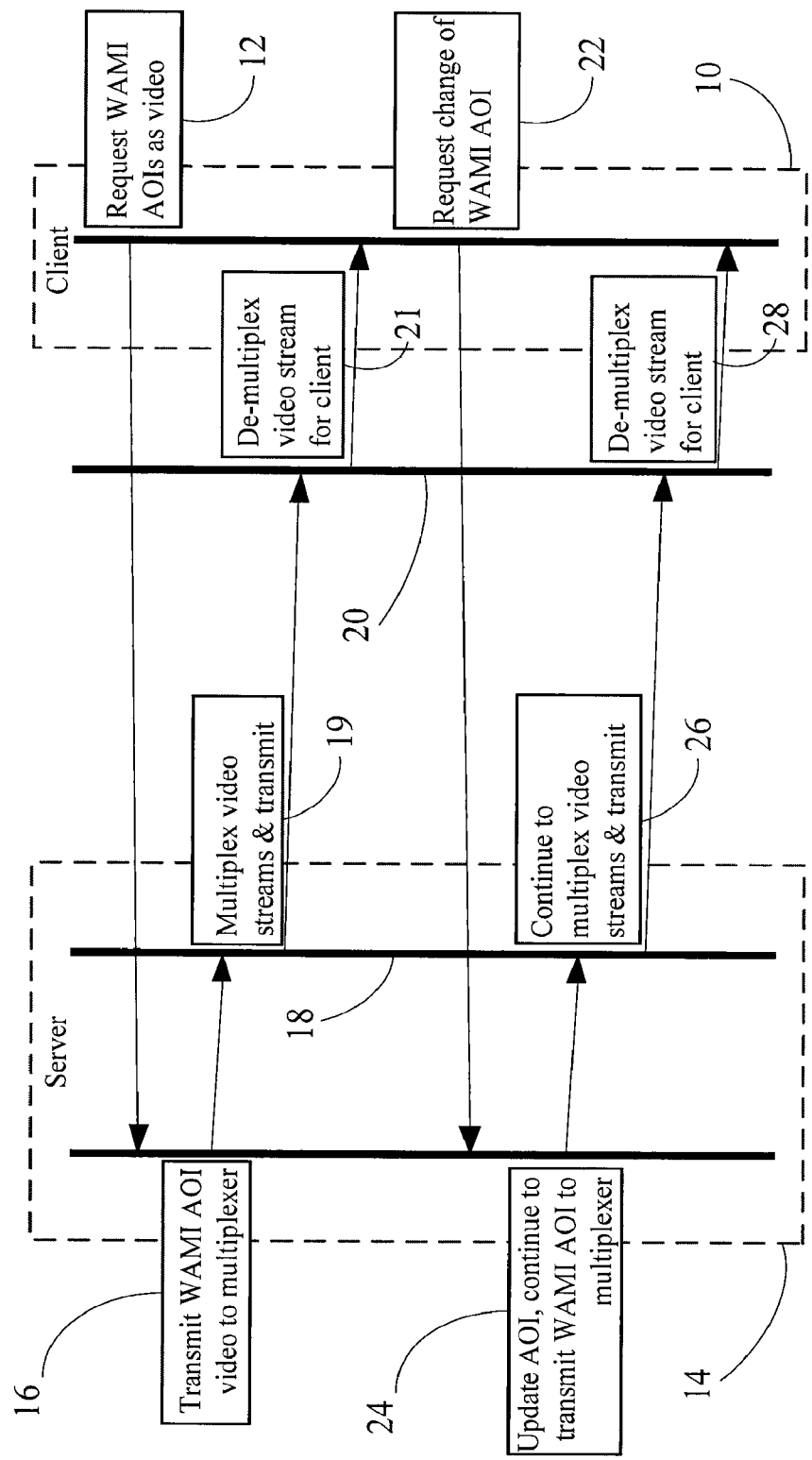
FIG. 6 is a time diagram of a process for providing a video codestream, according to an embodiment of the present invention.

FIG. 6 is a time diagram of a process for providing a video codestream, according to an embodiment of the present invention. In one embodiment, the process can be implemented, for example, as a web service. In one embodiment, a user associated with a client computer 10 sends a request 12 to a server 14 for wide area motion imagery (WAMI) areas of interest (AOIs). In one embodiment, one or more clients $C_i$ ($1 \le i \le N$) may send the request to server 14. The request 12 may contain parameters indicating a specific collection of large format images (LFIs) from where the WAMI AOIs will be extracted and a start time $T_1$ and end time $T_2$. Upon receiving the request 12, the server 14 initiates a video codestream and transmits the WAMI AOIs video codestream at 16 to a multiplexer 18. In one embodiment, multiplexer 18 is provided as hardware or software application within server 14, as depicted in FIG. 6. However, as it can be appreciated, in another embodiment, the multiplexer 18 can also be provided as hardware or software application outside the server 14. The server 14 performs this operation for multiple WAMI AOI video codestreams. The multiplexer 18 multiplexes the plurality or multiple video codestreams and transmits at 19 the multiple video codestreams as a multiplexed video codestream to demultiplexer 20. In one embodiment, the multiplexed video codestream is continuous and the format of all multiple video codestreams is the same. In one embodiment, the multiplexer 18 is continuously multiplexing and transmitting the multiple video codestreams including the one requested by $C_1$, as a multiplexed video codestream. The demultiplexer 20 demultiplexes at 21 the multiplexed or combined video codestream into the original plurality of video codestreams. In one embodiment, the demultiplexer 20 is provided as hardware or software application outside the client $C_1$ 10, as depicted in FIG. 6. In one embodiment, the demultiplexer 20 is in communication with the client $C_1$ 10. In one embodiment, the client $C_1$ 10 receives the video codestream and consumes the video codestream. Each client $C_1$ 10 consumes its requested video codestream. In one embodiment, if a client $C_1$ 10 decides to alter a spatial and/or temporal parameter(s) of the AOIs, i.e., change a position of the requested AOIs or a start time $T_1$ for extracting the AOIs from the LFIs, the client 10 sends a change of the request of WAMI AOI 22 to the server 14. The server 14 then processes the change of the request 22 by moving to a new AOI in the collection of LFIs, the new AOI satisfying the altered spatial and/or temporal parameter(s). In one embodiment, the server 14 while processing the altered request 22 and updating the AOIs may meanwhile continue sending or transmitting at 24 the WAMI AOIs to the multiplexer 18 as an $i^{th}$ video codestream. In one embodiment, the server continuously updates the AOIs. In one embodiment, the multiplexer 18 continues multiplexing the video codestreams and transmitting at 26 the video codestreams as multiplexed video codestream. In one embodiment, a frame rate at which the video codestream is sent need not be the same as a frame rate at which the AOIs are updated within the $i^{th}$ video codestream. In one embodiment, metadata regarding the AOIs may be embedded within the video codestream. For example, metadata can be embedded in a video codestream as audio, close captioned information, or key length value (KLV) fields. The multiplexed video codestream is sent to demultiplexer 20 and is demultiplexed at 28 into video codestream for client consumption. As a result, the client 10 is able to receive a sequence of images or video from a different location in the collection of LFIs as requested by the client 10.

Figure 7:
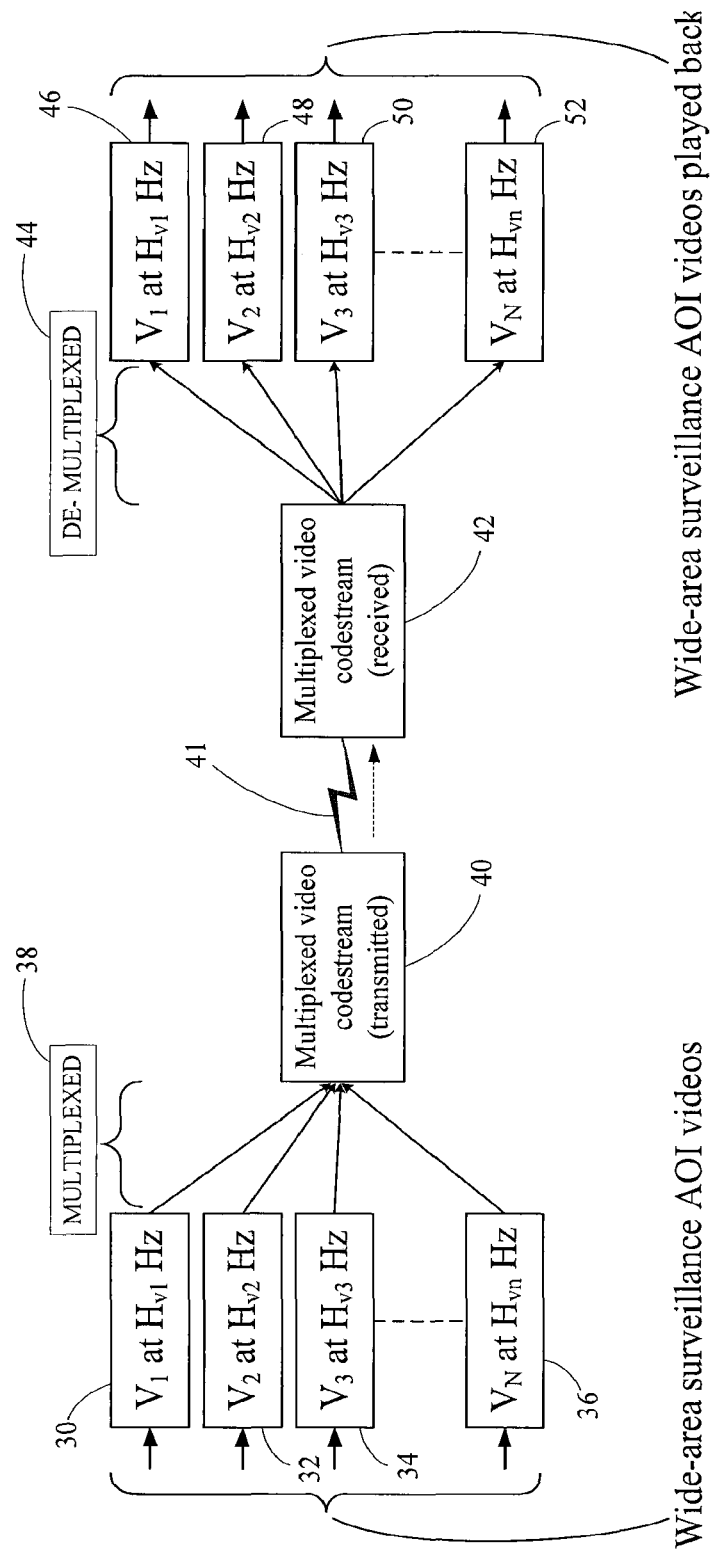
FIG. 7 is a flow diagram of a method to multiplex multiple video codestreams into a multiplexed codestream, according to an embodiment of the present invention.

FIG. 7 is a flow diagram of a method to multiplex multiple video codestreams into a multiplexed codestream, according to an embodiment of the present invention. For example, video codestream $V_1$ may be captured at a rate of $Hv_1$ Hz, at 30, $V_2$ may be captured at a rate of $Hv_2$ Hz, at 32, $V_3$ may be captured at a rate of $Hv_3$ Hz, at 34, . . . and $V_N$ may be captured at $Hv_n$ Hz, at 36. The capture rates $Hv_1$, $Hv_2$, $Hv_3$ etc. can be equal or different. The video codestreams $V_1$, $V_2$, . . . , $V_N$ are multiplexed in a multiplexed video codestream at a first location (e.g., sender location), at 38. The individual video codestreams are encoded into a bit rate of the multiplexed video codestream. Therefore, the bit rate of the original video codestreams $V_1$, $V_2$, . . . , $V_N$ may have to be modified. For example, the bit rate of the original video codestreams may be reduced or dialed down so as to fit into the bit rate of the multiplexed video codestream.

For example, if there are five original video codestreams $V_1$, $V_2$, . . . , $V_5$ and each video codestream is at a bit rate of 5 Mbps, 25 Mbps may be needed to transmit all five video codestreams $V_1$, $V_2$, . . . , $V_5$ as a multiplexed video codestream. However, if only 10 Mbps of bandwidth is available for transmitting the multiplexed video codestream, the bit rate of the original video codestreams may need to be modified to "fit" into the 10 Mbps limited bandwidth. If, for example, two of the five original video codestreams are very important to the user and thus are set to have the best possible quality as requested by the user while the three remaining video codestreams are considered by the user to be of less importance and thus may have a lower quality, the 10 Mbps bandwidth can be divided into 4 Mbps for the two important video codestreams and the less important video codestream can be set to a lower bit rate of 700 Kbps, 650 Kbps and 650 Kbps. Therefore, while feeding the five video codestreams, the bit rate of each video codestream can be dynamically modified. As a result, the bit rate of each original video codestream can be controlled as desired such that the sum of all bit rates of each of the original video codestream is substantially equal to an allowed bit rate of bandwidth for the multiplexed video codestream.

The multiplexed video codestream can then be transmitted at 40. In one embodiment, the multiplexed video codestream can be transmitted via link 41, such as via cable broadcast channels, fiber optics channels, or wireless channels. At a second location (e.g., receiver location), the multiplexed video codestream is received, at 42. The multiplexed video codestream can then be demultiplexed, at 44, to regenerate the original codestreams $V_1$ at frame rate $Hv_1$, at 46, $V_2$ at frame rate $Hv_2$, at 48, $V_3$ at frame rate $Hv_3$, at 50 . . . , and $V_N$ at frame rate $Hv_{11}$, at 52. The video codestreams $V_1$, $V_2$, $V_3$, . . . , $V_N$ can then be played back as wide-area surveillance AOI videos on one or more displays. In one embodiment, $V_1$, $V_2$, $V_3$, . . . , $V_N$ can be played on a plurality of displays $D_1$, $D_2$, $D_3$, . . . $D_N$, where $V_1$ is played on $D_1$, $V_2$ is played on $D_2$, $V_3$ is played on $D_3$, . . . and $V_N$ is played on $D_N$. In another embodiment, $V_i$, $V_2$, $V_3$, . . . $V_N$ can be played on a number of displays smaller than the number of video codestreams. In which case, one or more video codestreams, for example $V_1$ and $V_2$, can be played on a same display.

For example, by using the present multiplexing scheme to send a plurality of video codestreams and then demultiplexing to reconstruct the original video codestreams, available links or broadcast channels such as cable, optical fiber, wireless, etc. can be used for transmission of the multiplexed video codestream without requiring additional infrastructure.

Figure 8:
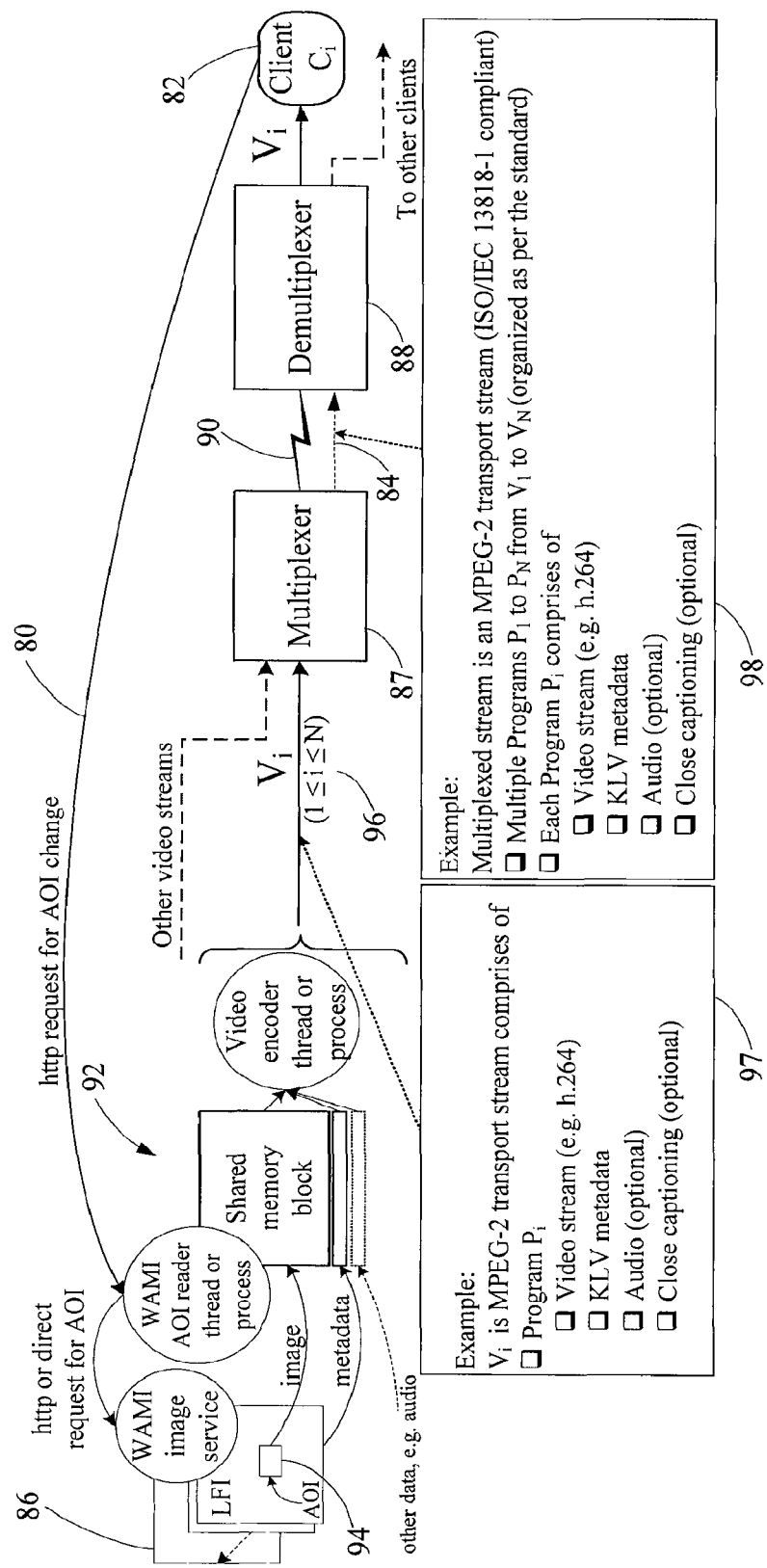
FIG. 8 is a diagram showing a process for generating and transmitting a multiplexed video codestream, according to an embodiment of the present invention.

FIG. 8 is a diagram showing a process for generating and transmitting a multiplexed video codestream, according to an embodiment of the present invention. Upon receiving a request (e.g., a HTTP request) from a client 82, the multiplexed video codestream 84 is generated from a sequence or video of areas of interest AOIs from one WAMI dataset 86 multiplexed using multiplexer 87 with other sequences or videos from other areas of interest AOIs from other WAMI datasets. The multiplexed video codestream 84 is transmitted to demultiplexer 88. The demultiplexer 88 receives the multiplexed video codestream 84 and demultiplexes the multiplexed video codestream 84 into the original video codestreams so that each video codestream can be exploited by the client that requested the video codestream. For example, one or more video codestreams (e.g., $V_1$, $V_2$ and $V_3$) may be sent to a client 82 that requested these video codestreams while other video codestreams (e.g., $V_4$, $V_5$, etc . . . ) may be sent to respective clients that requested the video codestreams. The content and format of each video codestream through a link 90 between the consumer of the video or user and a producer or server of the video 92 can be controlled.

In one embodiment, the server 92 of each video codestream is able to change the AOI 94, and/or the rate at which the AOI 94 is updated into the video codestream. For example, if the client 82 has "move left, right, up or down" buttons and "zoom in, zoom out" buttons, these buttons can be used to modify the AOI 94 that gets displayed in the video codestream. Other buttons may also be provided to the user or client to "flip the AOIs faster or slower" in the video. This information is conveyed back to the server 92 by the client as one or more parameters within a request 80. Each client requesting one or more video codestreams is able to change its specified AOI 94 and/or the rate at which the specified AOI 94 is updated into the one or more video codestreams that each client requested. Hence, each client is able to control independently from other clients its requested video codestream. The server or servers 92 can execute the request of each client $C_i$.

By controlling the AOIs, the client 82 controls the final bit rate of the resulting video codestream. For example, for one of several WAMI AOI video codestreams being multiplexed by multiplexer 87, if the source WAMI is being updated at the rate of 2 frames per second in a 30 FPS video code stream, the image update is about only twice a second. As a result, 15 frames of the video codestream are copies of one frame (one frame extracted from the two frames per second WAMI). Hence, a lower bit rate can be used while still obtaining a decent video quality since some frames are copies of one or two images. However, if the client requests for the AOIs to be updated faster, for example at 15 frames per second in a 30 fps video, each frame in the video codestream can only duplicate a frame AOI in the WAMI once. As a result, the bit rate of the output video codestream may have to be increased to counterbalance the faster update rate so as not to deteriorate the image video codestream quality and obtain a good image data for display.

In the 2 fps WAMI to 30 fps video codestream case, a frame in the 2 frames per second is repeated fifteen times. That is frame 1 is repeated fifteen times and frame 2 is also repeated fifteen times. For example, when the 30 fps video codestream is compressed, due to this relatively high redundancy of fifteen copies of a same frame, the frames of the obtained 30 fps video codestream compress well. Therefore, even if only a lower output bit rate is available, a lot of information can be transmitted in that lower bit rate. On the other hand, in the 15 fps WAMI to 30 fps video codestream case, one frame is only repeated twice frame. Hence, a temporal compression to a lower bit rate may degrade the quality of the video codestream. Hence a user may not be able to achieve as good a temporal compression as in the 2 fps to 30 fps case. In order to make the 30 fps video codestream obtained from the 15 fps WAMI appear as good as the 30 fps video codestream obtained from the 2 fps WAMI, the bit rate of the encoded video codestream may have to be increased.

In one embodiment, the video codestreams can be multiplexed using the ISO/IEC 13818-1 standard for multiplexing MPEG-2 transport video codestreams, as shown at 96. For example, a video codestream can be encoded as an MPEG2 transport stream (MPEG2 TS), as shown at 97. The video MPEG2 TS comprises a program. A description of the program can be found in the ISO/IEC 13818-1 standard. In one embodiment, the program includes the video codestream of AOIs from WAMI frames, encoded using the H.264 codec or MPEG2 codec, key length value or KLV metadata associated with each WAMI frame, audio codestream, close captioned data, or timing information as required by standard MPEG2 TS, or any combination of two or more thereof. In one embodiment a plurality of video codestreams that are MPEG2 TS with one program can be multiplexed, as shown at 98. Each video codestream program can be interleaved with programs from other MPEG2 TS video codestreams to generate a multiplexed MPEG2 TS in accordance with, for example, ISO/IEC 13818-1 standard. The demultiplexing process may also be implemented in accordance with a demultiplexing procedure using ISO/IEC 13818-1 standard.

With respect to timing information, each WAMI frame is provided with a time of acquisition. The time of acquisition can be stored as part of KLV metadata for each $V_i$ as shown in FIG. 8. Furthermore, as shown in FIG. 7, each WAMI AOI video stream $V_i$ is encoded at a known frame rate and bit rate. Therefore, after demultiplexing, the video codestream can be played back at the encoded playback rate. The video codestream can also be played back at any other playback rate that the client desires.

Although in the above description certain types of formats such as MPEG2 format, protocols or standards such as ISO/IEC 13818-1 standard are referred to in the description of some embodiments of the invention, as it can be appreciated the present invention is not in anyway limited to these formats, procedures, or protocols but can encompass other types of formats, procedures or protocols.

Although the various steps of the method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A method of transmitting a plurality of wide-area surveillance area-of-interest video codestreams, the method comprises:

generating, by a computer server, a first video codestream from a plurality of large format images that are captured sequentially in time, each of the plurality of large format images is at least 10,000 pixels wide by 9,600 pixels tall, the first video codestream comprising a first plurality of areas-of-interest selected from the plurality of large format images, each area-of-interest in the first plurality of areas-of-interest of the first video codestream being selected from a different image in the plurality of large format images, the first video codestream being generated at a first frame rate;

generating, by the computer server, a second video codestream from the same plurality of large format images from which the first video codestream is generated, the second video codestream comprising a second plurality of areas-of-interest selected from the plurality of large format images, each area-of-interest in the second plurality of areas-of-interest of the second video codestream being selected from a different image in the plurality of large format images, the second video codestream being generated at a second frame rate;

combining, by a multiplexer in communication with the computer server, the first video codestream and the second video codestream to obtain a combined video codestream, the combined video codestream having a third frame rate substantially equal to a sum of the first frame rate and the second frame rate; and transmitting the combined video codestream from the computer server to a demultiplexer through a transmission link, the computer server and the multiplexer being located at a first physical location and the demultiplexer being located at a second physical location remote from the first physical location.

2. The method according to claim 1, wherein the first plurality of areas-of-interest of the first video codestream are located at a first pixel location within the respective plurality of large format images, and the second plurality of areas-of-interest of the second video codestream are located at a second pixel location within the respective plurality of large format images.

3. The method according to claim 2, wherein the first pixel location and the second pixel location are different.

4. The method according to claim 1, further comprising receiving, by the computer server from a client computer in communication with the computer server, a request for the first video codestream or for the second video codestream in the plurality of video codestream, or both.

5. The method according to claim 4, wherein receiving by the computer server from the client computer the request comprises receiving a request by the client including parameters for generating the first video codestream, the second video codestream, or both.

6. The method according to claim 5, further comprising:
selecting, by the computer server, a pixel position of the first plurality of areas-of-interest or a pixel position of the second plurality of areas-of-interest, or both within corresponding plurality of large format images in accordance with the parameters of the request received from the client computer.

7. The method according to claim 5, further comprising:
selecting, by the computer server, a start time for extracting the first plurality of areas-of-interest or a start time for extracting the second plurality of areas-of-interest, or both from the plurality of large format images, in accordance with the parameters of the request received from the client computer.

8. The method according to claim 1, wherein the generating by the computer server of the first video codestream comprises generating by the computer server the first video codestream starting at a first time and ending at a second time, and wherein the generating by the computer server of the second video codestream comprises generating by the computer server the second video codestream starting at a third time and ending at a fourth time.

9. The method according to claim 8, wherein the first time is equal to the third time or the second time is equal to the fourth time, or both.

10. The method according to claim 1, wherein the first frame rate and the second frame rate are different from a frame rate of capture of the plurality of large format images.

11. The method according to claim 1, wherein the generating of the first video codestream and the second video codestream comprises generating the first video codestream and the second video codestream starting at a same image in the plurality of large format images.

12. The method according to claim 1, wherein the transmitting of the combined video codestream comprises transmitting the combined video codestream via a cable channel, a fiber optics channel, or a wireless channel or any combination of two or more thereof.

13. The method according to claim 1, further comprising:
demultiplexing, by the demultiplexer, the combined video codestream at the second physical location to regenerate and separate the first video codestream and the second video codestream.

14. The method according to claim 13, further comprising:
receiving, by a client computer from the demultiplexer, the regenerated first video codestream or the regenerated second video codestream, or both.

15. The method according to claim 1, further comprising playing back by the client computer the regenerated first and second video codestreams on a plurality of display devices.

16. The method according to claim 15, wherein the playing back comprises playing back by the client computer each video codestream on a separate display device.

17. The method according to claim 16, wherein the playing back comprises playing back by the client computer the first and the second video codestreams on a same display device.

18. The method according to claim 1, wherein each of the first plurality of areas-of-interest of the first video codestream and each of the second plurality of areas of interest of the second video codestream has a size substantially equal to a size of a display device on which each respective first video codestream and second video codestream is played.

19. The method according to claim 1, further comprising controlling the first frame rate or the second frame rate, or both such that the third frame rate is substantially equal to an allowed rate of bandwidth of the transmission link.

20. A system system for transmitting a plurality of wide-area surveillance area-of-interest video codestreams, the computer system comprising one or more processors, the one or more processors being configured to:
generate a first video codestream from a plurality of large format images that are captured sequentially in time, each of the plurality of large format images is at least 10,000 pixels wide by 9,600 pixels tall, the first video codestream comprising a first plurality of areas-of-interest selected from the plurality of large format images, each area-of-interest in the first plurality of areas-of-interest of the first video codestream being selected from a different image in the plurality of large format images, the first video codestream being generated at a first frame rate;

generate a second video codestream from the same plurality of large format images from which the first video codestream is generated, the second video codestream comprising a second plurality of areas-of-interest selected from the plurality of large format images, each area-of-interest in the second plurality of areas-of-interest of the second video codestream being selected from a different image in the plurality of large format images, the second video codestream being generated at a second frame rate;

combine the first video codestream and the second video codestream to obtain a combined video codestream, the combined video codestream having a third frame rate substantially equal to a sum of the first frame rate and the second frame rate; and transmit the combined video codestream to a demultiplexer through a transmission link, the computer system being located at a first physical location and the demultiplexer being located at a second physical location remote from the first physical location.

21. The system according to claim 20, wherein the first plurality of areas-of-interest of the first video codestream are located at a first pixel location within the respective plurality of large format images, and the second plurality of areas-of-interest of the second video codestream are located at a second pixel location within the respective plurality of large format images.

22. The system according to claim 20, wherein the one or more processors are configured to receive a request for the first video codestream or for the second video codestream in the plurality of video codestream, or both, from a client computer in communication with the computer system, the request including parameters for generating the first video codestream or the second video codestream, or both.

23. The system according to claim 22, further comprising:
selecting, by the computer server, a start time for extracting the first plurality of areas-of-interest or a start time for extracting the second plurality of areas-of-interest, or both, from the plurality of large format images, in accordance with the parameters of the request received from the client computer.

24. The system according to claim 20, wherein the one or more processors are configured to generate the first video codestream starting at a first time and ending at a second time, and generate the second video codestream starting at a third time and ending at a fourth time.

25. The system according to claim 24, wherein the first time is equal to the third time or the second time is equal to the fourth time or both.

26. The system according to claim 20, wherein the one or more processors are configured to generate the first video codestream and the second video codestream starting at a same image in the plurality of large format images.

27. The system according to claim 20, wherein the one or more processors are configured to transmit the combined video codestream via a cable channel, a fiber optics channel, or a wireless channel or any combination of two or more thereof to a demultiplexer, the demultiplexer being configured to demultiplex the combined video codestream at the second physical location to regenerate and separate the first video codestream and the second video codestream.

28. The system according to claim 27, wherein the regenerated first and second video codestreams are further transmitted to a client computer to be played back on one or more display devices of the client computer.

29. The system according to claim 20, wherein the one or more processors are configured to control the first frame rate or the second frame rate, or both such that the third frame rate is substantially equal to an allowed rate of bandwidth of the transmission link.

* * * * *